(12) United States Patent
Chen et al.

(10) Patent No.: US 8,848,363 B2
(45) Date of Patent: Sep. 30, 2014

(54) HEAT DISSIPATION SYSTEM

(75) Inventors: Chen Chen, Shenzhen (CN); Hong-Zhi Sun, Shenzhen (CN); Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 717 days.

(21) Appl. No.: 13/152,410

(22) Filed: Jun. 3, 2011

(65) Prior Publication Data

US 2012/0147546 A1 Jun. 14, 2012

(30) Foreign Application Priority Data

Dec. 10, 2010 (CN) .......................... 2010 1 0582835

(51) Int. Cl.
*G06F 1/20* (2006.01)
*H05K 7/20* (2006.01)

(52) U.S. Cl.
CPC ....................................... *G06F 1/20* (2013.01)
USPC .............. 361/679.5; 361/679.48; 361/679.49; 361/692; 361/695; 361/697; 312/236; 454/184

(58) Field of Classification Search
USPC ............ 361/679.47–679.5, 679.54, 690, 692, 361/694–695, 697; 312/236; 454/184
See application file for complete search history.

(56) References Cited

U.S. PATENT DOCUMENTS

| | | | | |
|---|---|---|---|---|
| 5,691,883 | A | * | 11/1997 | Nelson .......................... 361/697 |
| 6,011,689 | A | * | 1/2000 | Wrycraft ....................... 361/695 |
| 6,034,870 | A | * | 3/2000 | Osborn et al. ................ 361/690 |
| 7,593,223 | B2 | * | 9/2009 | Kobayashi ................. 361/679.5 |
| 2009/0059514 | A1 | * | 3/2009 | Chi ............................... 361/687 |

* cited by examiner

*Primary Examiner* — Robert J Hoffberg
(74) *Attorney, Agent, or Firm* — Novak Druce Connolly Bove + Quigg LLP

(57) ABSTRACT

A heat dissipation system includes a computer case having a base plate and a back plate perpendicularly to the base plate, a motherboard on the base plate adjacent to the back plate, and a mass storage device beside the motherboard. The motherboard has a heat sink and a first fan on the heat sink. The base plate has a second fan beside the motherboard. The second fan is adjacent to the back plate. The mass storage device is away from the back plate. The first fan rotates in such a manner that airflow is drawn into the computer case, flows through the heat sink and is exhausted out of the computer case. The second fan rotates in such a manner that airflow is drawn into the computer case, flows through the mass storage device and is exhausted out of the computer case.

14 Claims, 3 Drawing Sheets

HEAT DISSIPATION SYSTEM

BACKGROUND

1. Technical Field

The disclosure generally relates to a heat dissipation system, and especially to a heat dissipation system for improving heat dissipation efficiency of a mass storage device in computer system.

2. Description of Related Art

A small form factor (SFF) is a computer form factor designed to minimize the spatial volume of a desktop computer. A typical SFF includes a CPU fan and a system fan in a computer case. A plurality of mass storage devices (hard disc driver, optical disc driver) is positioned in the computer case. A heat sink is mounted on the CPU to remove heat, and the CPU fan is fixed on the heat sink to blow airflow through the heat sink. The temperature of the airflow increases by the heat generated by the CPU as it passes through the heat sink. The heated airflow is then exhausted from the computer case by the system fan. However, the typical SFF heat dissipation system uses an axial flow CPU fan to dissipate heat for the CPU. The heated airflow tends to be reflected by other components and causes interference in the computer case, which has an influence on mass storage devices so heat dissipation is not efficient.

Therefore there is a room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
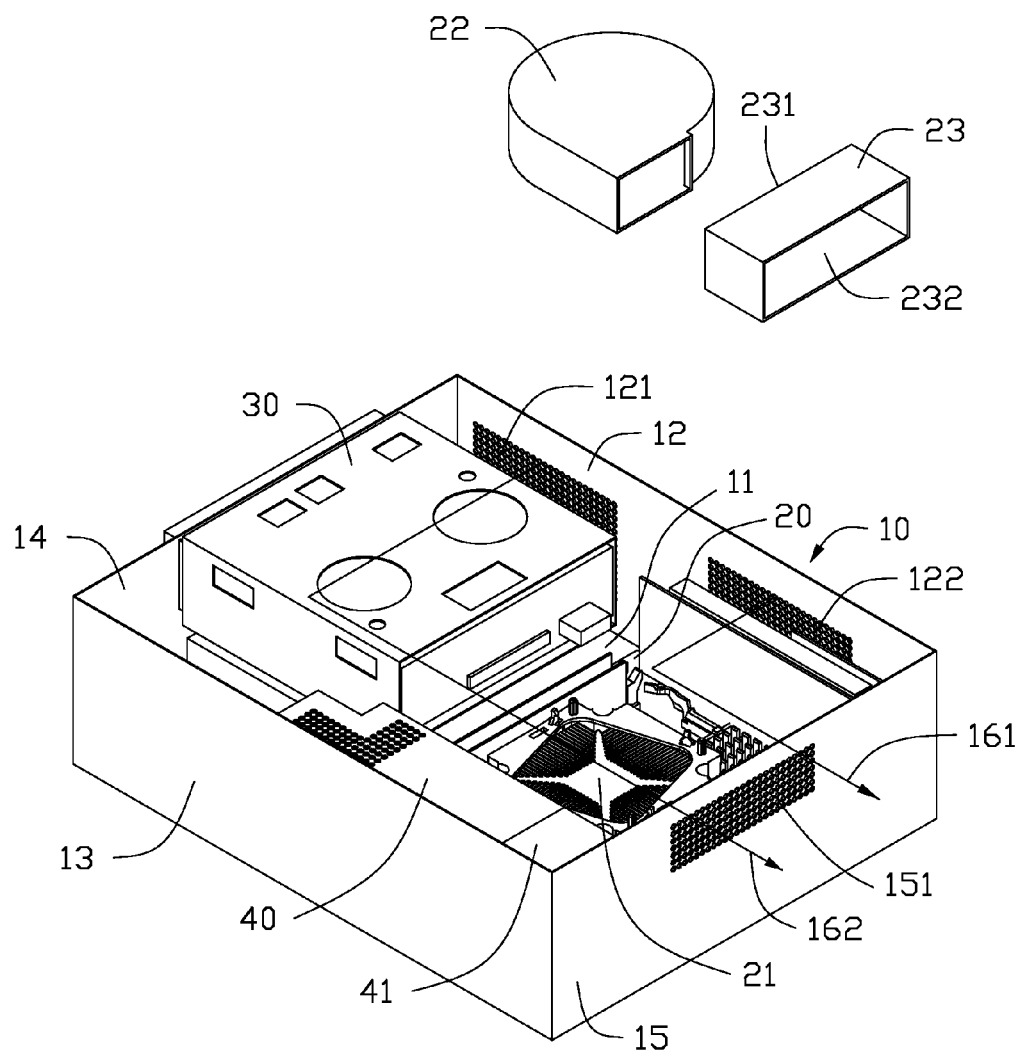
FIG. 1 is an exploded, isometric view of an embodiment of a heat dissipation system.

Referring to FIG. 1, an embodiment of a heat dissipation system includes a computer case 10. The computer case 10 includes a base plate 11, a first side plate 12, a second side plate 13, a front plate 14 and a back plate 15. The first side plate 12, the second side plate 13, the front plate 14 and the back plate 15 are perpendicular to the base plate 11.

The base plate 11 includes a motherboard 20 positioned thereon adjacent to the back plate 15. The motherboard 20 includes a heat sink 21 mounted thereon and a first fan 22 positioned on the heat sink 21. The base plate 11 includes a mass storage device 30 positioned beside the motherboard 20. The mass storage device 30 is adjacent to the front plate 14. Cool air from outside is able to flow through the heat sink 21 and the mass storage device 30 along a first direction. Cool air heated by the heat sink 21 and the mass storage device 30 is exhausted from the computer case 10 along a second direction perpendicular to the first direction.

The base plate 11 includes a heat source 40 positioned beside the motherboard 20 and a second fan 41 positioned on the heat source 40. The heat source 40 and the second fan 41 are adjacent to the back plate 15. A plurality of first air inlet holes 121 are defined on the first side plate 12 and aligned with the mass storage device 30. A plurality of second air inlet holes 122 are defined on the first side plate 12 and aligned with the heat sink 21 and the first fan 22. Cool air from outside is able to flow through the mass storage device 30 via the plurality of first air inlet holes 121. Cool air heated by the mass storage device 30 is exhausted from the computer case 10 by the second fan 41 via the heat source 40. In one embodiment, the first fan 22 is a centrifugal fan; the third direction is perpendicular to the first direction and the second direction; the mass storage device 30 is a hard disc mass storage; and the heat source 40 is a power supply.

Figure 2:
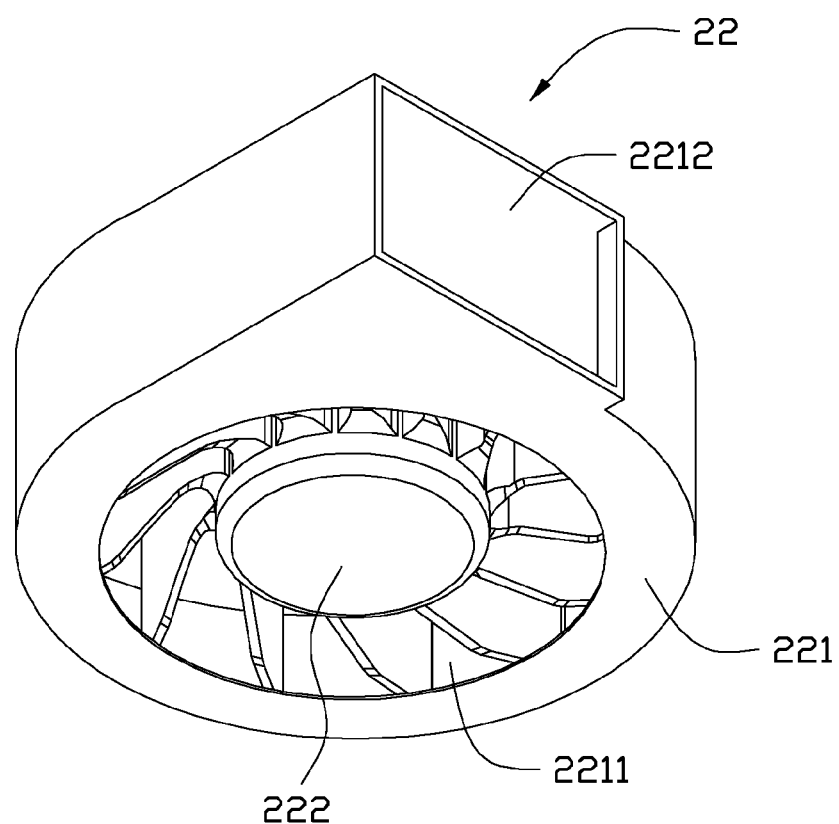
FIG. 2 is an enlarged view of a first fan of the embodiment of FIG. 1.
Figure 3:
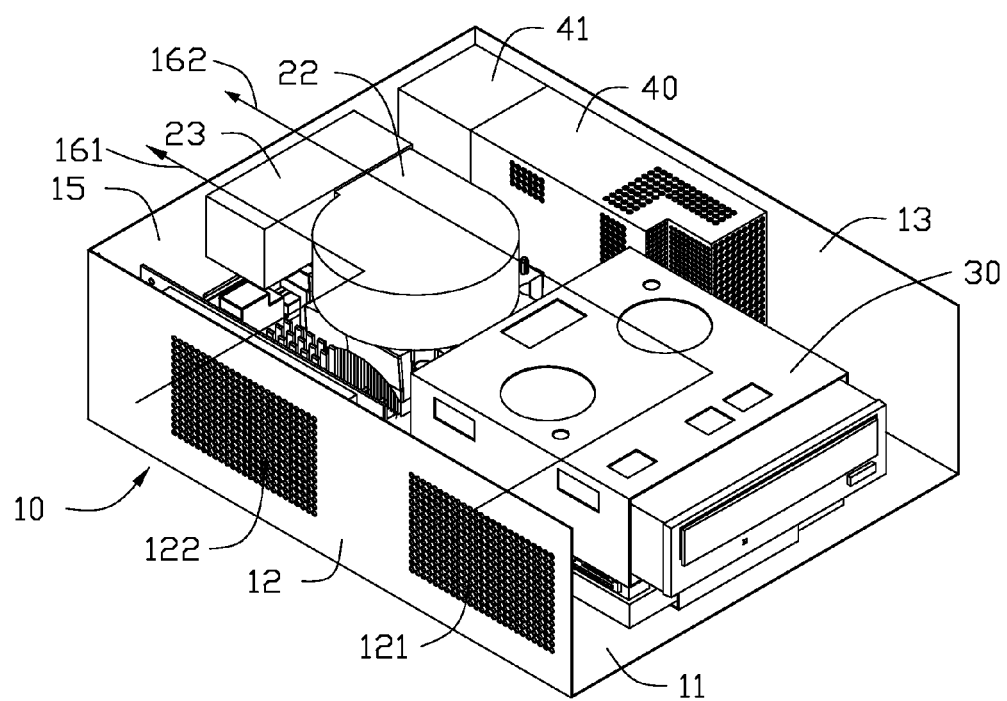
FIG. 3 is an assembled view of the embodiment of FIG. 1.

Referring to FIGS. 2 and 3, the first fan 22 includes a shell 221 and a rotatable fan blade module 222. A first air inlet opening 2211 is defined in a top plate of the shell 221. The shell 221 further has a first air outlet opening 2212 defined at one side thereof. The first air inlet opening 2211 allows air to flow into the first fan 22 along a third direction parallel to a rotating axis of the fan blade module 222. The first air outlet opening 2212 allows air to flow out from the first fan 22 along the second direction. Cool air from outside is able to flow through the heat sink 21 and pass through the first air inlet opening 2211 along the third direction. Cool air removes heat from the heat sink 21 is then exhausted from the computer case 10 via the first air outlet opening 2212 along the second direction. An air duct 23 is attached on the motherboard 20. The air duct 23 includes a second air inlet opening 231 and a second air outlet opening 232. The second air inlet opening 231 is in communication with the first air outlet opening 2212. A plurality of air outlet holes 151 are defined on the back plate 15 and aligned with the second air outlet opening 232. Cool air from outside is able to flow through the heat sink 21 via the plurality of second air inlet holes 122. Cool air heated by the heat sink 21 is exhausted from the computer case 10 by the first fan 22 via the air duct 23 and the plurality of air outlet holes 151.

In use, the first fan 22 and the second fan 41 rotate to work. The cool air from outside is drawn into the computer case 10 via the plurality of first air inlet holes 121 and the plurality of second air inlet holes 122 and flows through the heat sink 21 and the mass storage device 30. The speed of the cool air is accelerated when passing through the first fan 22 and the second fan 41. The cool air displaces the warm air heated by the heat sink 21 and the mass storage device 30. The warm air from the heat sink 21 is exhausted from the computer case 10 by the first fan 22. The warm air from the mass storage device 30 is exhausted from the computer case 10 by the second fan 41 via the heat source 40. A first air path 161 is defined between the plurality of second air inlet holes 122 and the plurality of air outlet holes 151. The first air path 161 directs the cool air toward the heat sink 21 and out of the computer case 10 via the plurality of air outlet holes 151 by the first fan 22. A second air path 162 is defined between the plurality of first air inlet holes 121 and the second fan 41. The second air path 162 directs the cool air toward the mass storage device 30 and out of the computer case 10 via the second fan 41.

Using a software application called Icepak to simulate the efficiency of the heat dissipation system, the following results of an embodiment shown below were obtained. The simulated conditions are set to: initial ambient temperature 35 degrees Celsius. The heat sink 21 is used to dissipate heat for a CPU (not shown). A power dissipation of the CPU is 95 W. A power dissipation of the mass storage device 30 is 5.4 W. The simulation according to the set conditions shows that the maximum temperature on the CPU is 65.6 degrees Celsius and the maximum temperature on the mass storage device 30 is 41.2 degrees Celsius when using the heat dissipation system of the disclosure. The maximum temperature on the CPU is 59.7 degrees Celsius and the maximum temperature on the mass storage device 30 is 62.3 degrees Celsius when using a common heat dissipation system. Usually a threshold value of the temperature on the CPU is 71 degrees Celsius, and a threshold value of the temperature on the mass storage device 30 is 50 degrees Celsius. The result shows that the maximum temperature on the CPU is less than the threshold value. The maximum temperature on the mass storage device 30 is largely decreased to less than the threshold value and heat dissipation efficiency is improved.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A heat dissipation system comprising:
   a computer case having a base plate, a side plate perpendicularly to the base plate and a back plate perpendicularly to the side plate;
   a motherboard, attached on the base plate, adjacent to the back plate; the motherboard has a heat sink mounted thereon, and a first fan positioned on the heat sink;
   a mass storage device mounted on the computer case beside the motherboard; the mass storage device is away from the back plate;
   a heat source positioned on the base plate beside the motherboard and a second fan positioned on the heat source, the heat source and the second fan are adjacent to the back plate;
   a plurality of first air inlet holes are defined on the side plate and aligned with the mass storage device;
   a plurality of second air inlet holes are defined on the side plate and aligned with the heat sink and the first fan;
   a first air path defined between the plurality of second air inlet holes and the back plate; the first air path is adapted to direct a first airflow toward the heat sink along a first direction and out of the computer case along a second direction, the second direction is perpendicular to the first direction; and
   a second air path defined between the plurality of first air inlet holes and the back plate; the second air path is adapted to direct a second airflow toward the mass storage device along the first direction and out of the computer case the second fan via the heat source along the second direction.

2. The heat dissipation system of claim 1, wherein a plurality of air outlet holes are defined on the back plate and aligned with the first fan; and the first air path is defined between the plurality of second air inlet holes and the plurality of air outlet holes.

3. The heat dissipation system of claim 2, wherein the first fan comprises a first air inlet opening and a first air outlet opening; the first airflow is drawn into the first fan via the first air inlet opening along a third direction parallel to a rotating axis of the first fan; and the first airflow is blown out of the first fan via the first air outlet opening along the second direction.

4. The heat dissipation system of claim 3, wherein the first fan is a centrifugal fan; the third direction is perpendicular to the first direction and the second direction.

5. The heat dissipation system of claim 3, wherein an air duct is attached on the motherboard; the air duct comprises a second air inlet opening and a second air outlet opening; the second air inlet opening is in communication with the first air outlet opening; and the second air inlet opening is aligned with the plurality of air outlet holes.

6. The heat dissipation system of claim 1, wherein the mass storage device is a hard disc drive; and the heat source is a power supply.

7. A heat dissipation system comprising:
   a computer case having a base plate and a back plate perpendicularly to the base plate;
   a motherboard, attached on the base plate, adjacent to the back plate; the motherboard has a heat sink mounted thereon, and a first fan positioned on the heat sink; the base plate has a heat source and a second fan positioned thereon beside the motherboard; and the second fan positioned on the heat source, the heat source and the second fan are adjacent to the back plate;
   a mass storage device mounted on the computer case beside the motherboard; the mass storage device is away from the back plate;
   wherein the first fan is adapted to rotate in such a manner that a first airflow is drawn into the computer case along a first direction, flows through the heat sink and blown out of the computer case along a second direction, the second direction is perpendicular to the first direction; and
   wherein the second fan is adapted to rotate in such a manner that a second airflow is drawn into the computer case along the first direction, flows through the mass storage device and blown out of the computer case via the heat source and the second fan along the second direction.

8. The heat dissipation system of claim 7, wherein the computer case further comprises a side plate that is perpendicular to the base plate and the back plate; a plurality of first air inlet holes are defined on the side plate and aligned with the mass storage device; and a plurality of second air inlet holes are defined on the side plate that aligned with the heat sink and the first fan.

9. The heat dissipation system of claim 8, wherein a first air path is defined between the plurality of second air inlet holes and the back plate; and the first air path is adapted to direct the first airflow toward the heat sink along the first direction and out of the computer case along the second direction.

10. The heat dissipation system of claim 9, wherein a plurality of air outlet holes are defined on the back plate and aligned with the first fan; and the first air path is defined between the plurality of second air inlet holes and the plurality of air outlet holes.

11. The heat dissipation system of claim 10, wherein the first fan comprises a first air inlet opening and a first air outlet opening; the first airflow is drawn into the first fan via the first air inlet opening along a third direction parallel to a rotating axis of the first fan; and the first airflow is blown out of the first fan via the first air outlet opening along the second direction.

12. The heat dissipation system of claim 11, wherein the first fan is a centrifugal fan; the third direction is perpendicular to the first direction and the second direction.

13. The heat dissipation system of claim 11, wherein an air duct is attached on the motherboard; the air duct comprises a second air inlet opening and a second air outlet opening; the second air inlet opening is in communication with the first air outlet opening; and the second air inlet opening is aligned with the plurality of air outlet holes.

14. The heat dissipation system of claim 8, wherein a second air path is defined between the plurality of first air inlet holes and the back plate; and the second air path is adapted to direct the second airflow toward the mass storage device along the first direction and out of the computer case via the heat source and the second fan along the second direction.

* * * * *